United States Patent
Guo et al.

(10) Patent No.: US 11,460,743 B2
(45) Date of Patent: Oct. 4, 2022

(54) ARRAY SUBSTRATE, LIGHT CONTROL PANEL, AND DISPLAY DEVICE

(71) Applicants: WUHAN BOE OPTOELECTRONICS TECHNOLOGY CO., LTD., Wuhan (CN); BOE TECHNOLOGY GROUP CO., LTD., Beijing (CN)

(72) Inventors: Yuanhui Guo, Beijing (CN); Yujie Gao, Beijing (CN); Wei Guo, Beijing (CN); Kun Guo, Beijing (CN); Yanping Liao, Beijing (CN)

(73) Assignees: WUHAN BOE OPTOELECTRONICS TECHNOLOGY CO., LTD., Wuhan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/288,188

(22) PCT Filed: Aug. 19, 2020

(86) PCT No.: PCT/CN2020/109937
§ 371 (c)(1),
(2) Date: Apr. 23, 2021

(87) PCT Pub. No.: WO2021/036874
PCT Pub. Date: Mar. 4, 2021

(65) Prior Publication Data
US 2021/0405490 A1    Dec. 30, 2021

(30) Foreign Application Priority Data
Aug. 23, 2019   (CN) .......................... 201910782667.4

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01)

(58) Field of Classification Search
CPC ................................................ G02F 1/136286
See application file for complete search history.

(56) References Cited

U.S. PATENT DOCUMENTS

| 8,102,487 B2 | 1/2012 | Kitagawa et al. |
| 11,003,035 B2 | 5/2021 | Liu et al. |

(Continued)

FOREIGN PATENT DOCUMENTS

| CN | 101059619 A | 10/2007 |
| CN | 102945647 A | 2/2013 |

(Continued)

OTHER PUBLICATIONS

Written Opinion of PCT/CN2020/109937 dated Nov. 19, 2020 in English.

(Continued)

*Primary Examiner* — Sang V Nguyen
(74) *Attorney, Agent, or Firm* — Collard & Roe, P.C.

(57) ABSTRACT

An array substrate, a light control panel and a display device are provided. The array substrate includes a plurality of gate lines respectively extending along a first direction, a plurality of data lines respectively extending along a second direction intersected with the first direction, and a plurality of light control pixel units. Each of the plurality of gate lines includes a plurality of grid parts arranged side by side along the first direction and connected in sequence, and each of the plurality of grid parts includes a grid line and an opening area surrounded by the grid line.

17 Claims, 7 Drawing Sheets

(56) References Cited

U.S. PATENT DOCUMENTS

| | | | |
|---|---|---|---|
| 2017/0243342 A1* | 8/2017 | Iwami | H04N 9/735 |
| 2018/0018047 A1* | 1/2018 | Iwami | G06F 3/0412 |
| 2018/0039125 A1 | 2/2018 | Kubota et al. | |
| 2020/0292894 A1* | 9/2020 | Liu | G02F 1/13471 |

FOREIGN PATENT DOCUMENTS

| | | |
|---|---|---|
| CN | 108983463 A | 12/2018 |
| CN | 210376953 U | 4/2020 |

OTHER PUBLICATIONS

International Search Report of PCT/CN2020/109937 in Chinese, dated Nov. 19, 2020 with English translation.
Written Opinion of PCT/CN2020/109937 in Chinese, dated Nov. 19, 2020.

\* cited by examiner

Fig. 11

ARRAY SUBSTRATE, LIGHT CONTROL PANEL, AND DISPLAY DEVICE

CROSS REFERENCE TO RELATED APPLICATIONS

This application is the National Stage of PCT/CN2020/109937 filed on Aug. 19, 2020, which claims priority under 35 U.S.C. § 119 of Chinese Application No. 201910782667.4 filed on Aug. 23, 2019, the disclosure of which is incorporated by reference.

TECHNICAL FIELD

Embodiments of the present disclosure relate to an array substrate, a light control panel and a display device.

BACKGROUND

A liquid crystal display device includes a backlight module and a liquid crystal panel, the backlight module is disposed on a non-display side of the liquid crystal panel to provide a light source for a display operation of the display panel. The liquid crystal panel includes a polarizer, an array substrate, an opposite substrate and a liquid crystal molecular layer filled between the two substrates. The liquid crystal display device rotates the liquid crystal molecules in the liquid crystal molecular layer by forming an electric field between the array substrate and the opposite substrate, and the liquid crystal molecules upon being rotated can be aligned with the polarizer to form a liquid crystal light valve. Since the liquid crystal molecular layer itself does not emit light, it is necessary to realize a display function with the aid of the backlight module. With the continuous development of display technology, users put forward increasingly higher requirements on a contrast ratio and a brightness uniformity of the display device.

SUMMARY

At least one embodiment of the present disclosure provides an array substrate. The array substrate includes a plurality of gate lines respectively extending along a first direction, a plurality of data lines respectively extending along a second direction intersected with the first direction, and a plurality of light control pixel units. Each of the plurality of gate lines includes a plurality of grid parts arranged side by side along the first direction and connected in sequence, and each of the plurality of grid parts includes a grid line and an opening area surrounded by the grid line.

For example, in at least one example of the array substrate, the grid line of each of the plurality of grid parts includes a first polygonal-line shaped trace and a second polygonal-line shaped trace; a starting point of the first polygonal-line shaped trace is connected with a starting point of the second polygonal-line shaped trace; an ending point of the first polygonal-line shaped trace is connected with an ending point of the second polygonal-line shaped trace; and a vertex of the first polygonal-line shaped trace and a vertex of the second polygonal-line shaped trace are spaced apart in the second direction.

For example, in at least one example of the array substrate, the first polygonal-line shaped trace includes a first line segment and a second line segment which are sequentially connected, and a connection point between the first line segment and the second line segment is the vertex of the first polygonal-line shaped trace; the second polygonal-line shaped trace includes a third line segment and a fourth line segment which are sequentially connected, and a connection point between the third line segment and the fourth line segment is the vertex of the second polygonal-line shaped trace; and an absolute value of an acute angle between the first line segment and the first direction, an absolute value of an acute angle between the second line segment and the first direction, an absolute value of an acute angle between the third line segment and the first direction, and an absolute value of an acute angle between the fourth line segment and the first direction are between 38 degrees and 55 degrees.

For example, in at least one example of the array substrate, the absolute value of the acute angle between the first line segment and the first direction, the absolute value of the acute angle between the second line segment and the first direction, the absolute value of the acute angle between the third line segment and the first direction, and the absolute value of the acute angle between the fourth line segment and the first direction are between 42 degrees and 48 degrees.

For example, in at least one example of the array substrate, the first polygonal-line shaped trace and the second polygonal-line shaped trace are symmetrical with respect to a connecting line between the starting point of the first polygonal-line shaped trace and the ending point of the first polygonal-line shaped trace.

For example, in at least one example of the array substrate, the first line segment and the second line segment are symmetrical with respect to a connecting line between the vertex of the first polygonal-line shaped trace and the vertex of the second polygonal-line shaped trace; and the third line segment and the fourth line segment are symmetrical with respect to the connecting line between the vertex of the first polygonal-line shaped trace and the vertex of the second polygonal-line shaped trace.

For example, in at least one example of the array substrate, each of the plurality of data lines has two overlapping positions with the grid line of one corresponding grid part in a direction perpendicular to the array substrate, or each of the plurality of data lines is overlapped with a connecting position between two adjacent grid parts in the direction perpendicular to the array substrate.

For example, in at least one example of the array substrate, the array substrate further includes common electrode lines extending along the second direction. Each of the common electrode lines is overlapped with the connecting position between the two adjacent grid parts in the direction perpendicular to the array substrate, or each of the common electrode lines has two overlapping positions with the grid line of one corresponding grid part in the direction perpendicular to the array substrate.

For example, in at least one example of the array substrate, the opening area surrounded by each of the plurality of grid parts is partly overlapped with one or two of the plurality of light control pixel units in a direction perpendicular to the array substrate.

For example, in at least one example of the array substrate, a boundary trace of each of the plurality of light control pixel units is formed by corresponding data lines and the first polygonal-line shaped traces of the grid parts of corresponding gate lines; and the second polygonal-line shaped trace of the grid part of each of the plurality of gate lines passes through an interior of a corresponding light control pixel unit.

For example, in at least one example of the array substrate, the array substrate further includes common electrode lines extending along the second direction. Each of the common electrode lines is overlapped with a connecting position between two adjacent grid parts in a direction perpendicular to the array substrate; a boundary trace of each of the plurality of light control pixel units is formed by corresponding common electrode lines and the first polygonal-line shaped traces of the grid parts of corresponding gate lines; and the second polygonal-line shaped trace of the grid part of each of the plurality of gate lines passes through an interior of a corresponding light control pixel unit.

For example, in at least one example of the array substrate, each of the plurality of light control pixel units further includes a switching element and a pixel electrode; the switching element includes a gate electrode, a source electrode and a drain electrode, the gate electrode of the switching element is electrically connected with a corresponding second polygonal-line shaped trace, and one of the source electrode and the drain electrode of the switching element is electrically connected with the pixel electrode; and the switching element and the second polygonal-line shaped trace have the same amount as each other.

For example, in at least one example of the array substrate, a width of the first polygonal-line shaped trace and a width of the second polygonal-line shaped trace both are between 9 microns and 11 microns.

For example, in at least one example of the array substrate, the grid line of each of the plurality of grid parts includes a first polygonal-line shaped trace and a second polygonal-line shaped trace; a starting point of the first polygonal-line shaped trace is connected with a starting point of the second polygonal-line shaped trace; an ending point of the first polygonal-line shaped trace is connected with an ending point of the second polygonal-line shaped trace; a vertex of the first polygonal-line shaped trace and a vertex of the second polygonal-line shaped trace are spaced apart in the second direction; the first polygonal-line shaped trace includes a first line segment and a second line segment which are sequentially connected, and a connection point between the first line segment and the second line segment is the vertex of the first polygonal-line shaped trace; the second polygonal-line shaped trace includes a third line segment and a fourth line segment which are sequentially connected, and a connection point between the third line segment and the fourth line segment is the vertex of the second polygonal-line shaped trace; an absolute value of an acute angle between the first line segment and the first direction, an absolute value of an acute angle between the second line segment and the first direction, an absolute value of an acute angle between the third line segment and the first direction, and an absolute value of an acute angle between the fourth line segment and the first direction are between 42 degrees and 48 degrees; the first polygonal-line shaped trace and the second polygonal-line shaped trace are symmetrical with respect to a connecting line between the starting point of the first polygonal-line shaped trace and the ending point of the first polygonal-line shaped trace; the first line segment and the second line segment are symmetrical with respect to a connecting line between the vertex of the first polygonal-line shaped trace and the vertex of the second polygonal-line shaped trace; the third line segment and the fourth line segment are symmetrical with respect to the connecting line between the vertex of the first polygonal-line shaped trace and the vertex of the second polygonal-line shaped trace; each of the plurality of data lines has two overlapping positions with the grid line of one corresponding grid part in a direction perpendicular to the array substrate; the array substrate further includes common electrode lines extending along the second direction; each of the common electrode lines is overlapped with a connecting position between two adjacent grid parts in the direction perpendicular to the array substrate; the opening area surrounded by each of the plurality of grid parts is partly overlapped with two of the plurality of light control pixel units in the direction perpendicular to the array substrate; a boundary trace of the light control pixel unit is formed by corresponding data lines and the first polygonal-line shaped traces of the grid parts of corresponding gate lines; the second polygonal-line shaped trace of the grid part of each of the plurality of gate lines passes through an interior of a corresponding light control pixel unit; and each of the plurality of light control pixel units further includes a switching element and a pixel electrode; the switching element includes a gate electrode, a source electrode and a drain electrode; the gate electrode of the switching element is electrically connected with a corresponding second polygonal-line shaped trace; one of the source electrode and the drain electrode of the switching element is electrically connected with the pixel electrode; and the switching element and the second polygonal-line shaped trace have the same amount as each other.

At least one embodiment of the present disclosure also provides a light control panel including an array substrate, an opposite substrate and a liquid crystal layer. The array substrate and the opposite substrate are disposed opposite to each other; the liquid crystal layer is sandwiched between the array substrate and the opposite substrate; the array substrate includes a plurality of gate lines respectively extending along a first direction, a plurality of data lines respectively extending along a second direction intersected with the first direction, and a plurality of light control pixel units; each of the plurality of gate lines includes a plurality of grid parts arranged side by side along the first direction and connected in sequence; and each of the plurality of grid parts includes a grid line and an opening area surrounded by the grid line.

At least one embodiment of the present disclosure also provides a display device, including a display panel, a light control panel and a backlight unit. The display panel is located at a light exiting side of the light control panel; the backlight unit is located at a side of the light control panel away from the display panel. The light control panel includes an array substrate, an opposite substrate and a liquid crystal layer; the array substrate and the opposite substrate are disposed opposite to each other; the liquid crystal layer is sandwiched between the array substrate and the opposite substrate; the array substrate includes a plurality of gate lines respectively extending along a first direction, a plurality of data lines respectively extending along a second direction intersected with the first direction, and a plurality of light control pixel units; each of the plurality of gate lines includes a plurality of grid parts arranged side by side along the first direction and connected in sequence; and each of the plurality of grid parts includes a grid line and an opening area surrounded by the grid line.

For example, in at least one example of the display device, the display panel includes a plurality of display pixel units arranged in an array; a size of each of the plurality of grid parts in the first direction is equal to twice a size of each of the plurality of display pixel units in the first direction; and a size of each of the plurality of grid parts in the second direction is less than or equal to twice a size of each of the plurality of display pixel units in the second direction.

For example, in at least one example of the display device, a size of each of the plurality of light control pixel units in the first direction is equal to twice a size of each of the plurality of display pixel units in the first direction; and a size of each of the plurality of light control pixel units in the second direction is equal to 2.5 times to 3 times the size of each of the plurality of display pixel units in the first direction.

At least one embodiment of the present disclosure also provides a manufacturing method of an array substrate, including: forming a plurality of gate lines respectively extending along a first direction; and forming a plurality of data lines respectively extending along a second direction intersected with the first direction. The plurality of gate lines and the plurality of data lines are intersected to define a plurality of light control pixel units, each of the plurality of gate lines includes a plurality of grid parts arranged in parallel along the first direction and connected in sequence, and each of the plurality of grid parts includes a grid line and an opening area surrounded by the grid line.

BRIEF DESCRIPTION OF THE DRAWINGS

In order to clearly illustrate the technical solutions of the embodiments of the present disclosure, the drawings of the embodiments will be briefly described in the following; it is obvious that the described drawings below are only related to some embodiments of the present disclosure without construing any limitation thereto.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1A:
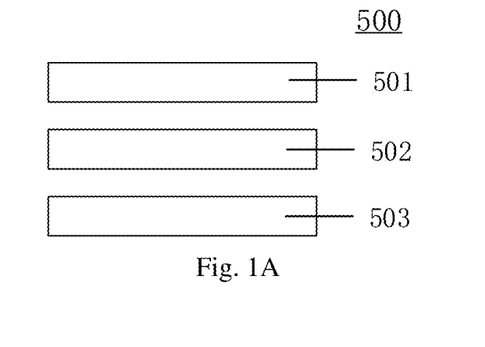
FIG. 1A illustrates a schematic cross-sectional view of a liquid crystal display device.
Figure 1B:
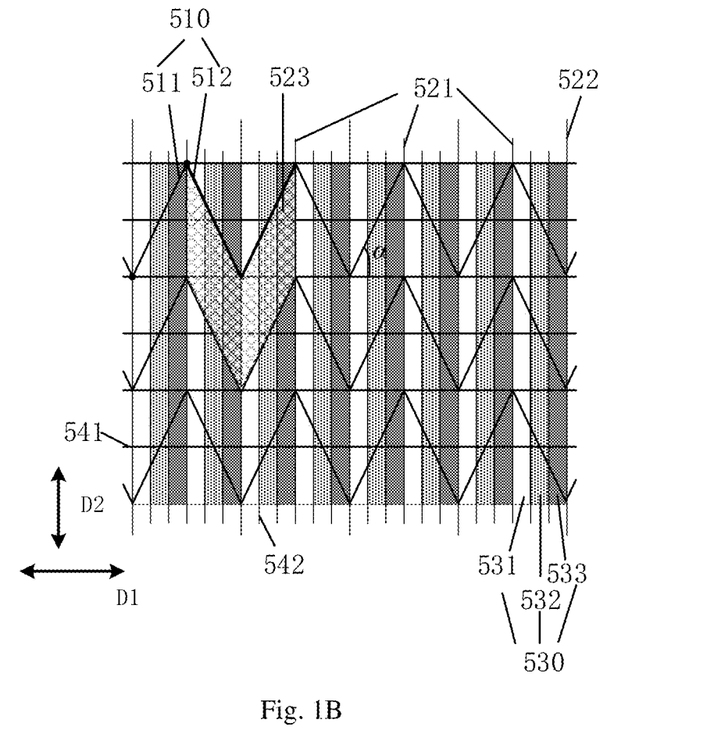
FIG. 1B illustrates a schematic plan view of a light control panel and a display panel of the liquid crystal display device illustrated in FIG. 1A.
Figure 1C:
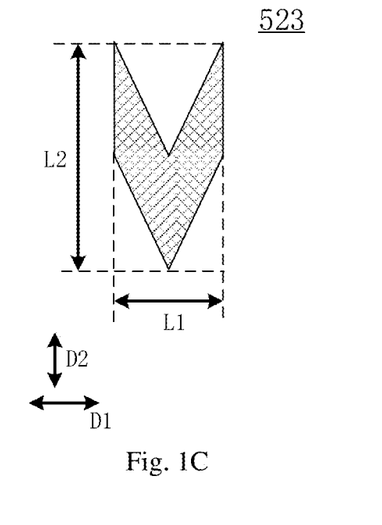
FIG. 1C illustrates a schematic plan view of a light control pixel unit of the light control panel illustrated in FIG. 1A.

During the research, the inventor of the present disclosure noticed that, a conventional liquid crystal display device (for example, a liquid crystal display device based on Advanced Super Dimension Switch (ADSDS) technology with a single liquid crystal cell) usually involves the problem of light leakage in dark state, which makes the contrast ratio of the display image of the liquid crystal display device relatively poor. During the research, the inventor of the present disclosure noticed that, the liquid crystal display device with double liquid crystal cells can be utilized to improve the contrast ratio of the display image, which will be exemplarily explained with reference to FIG. 1.

FIG. 1A illustrates a schematic cross-sectional view of a liquid crystal display device 500. As illustrated in FIG. 1A, the liquid crystal display device 500 includes a backlight unit 503, a light control panel 502, and a display panel 501 which are sequentially arranged (for example, in a direction perpendicular to the liquid crystal display device 500). FIG. 1B illustrates a schematic plan view of the light control panel 502 and the display panel 501 of the liquid crystal display device 500 illustrated in FIG. 1A. For example, the light control panel 502 is configured to adjust an intensity of light emitted by the backlight unit 503 and incident on the display panel 501.

As illustrated in FIG. 1B, the display panel 501 includes a plurality of first signal lines 541 extending along a first direction D1 and a plurality of second signal lines 542 extending along a second direction D2; the plurality of first signal lines 541 are intersected with the plurality of second signal lines 542 to define a plurality of display pixel units 530 (e.g., display sub-pixel units of the plurality of display pixel units 530); each display pixel unit 530 includes a first display sub-pixel unit 531, a second display sub-pixel unit 532 and a third display sub-pixel unit 533; the first display sub-pixel unit 531, the second display sub-pixel unit 532 and the third display sub-pixel unit 533 are, for example, a red display sub-pixel unit, a green display sub-pixel unit and a blue display sub-pixel unit, respectively. For example, the first direction D1 is intersected with (e.g., is perpendicular to) the second direction D2. For example, the first signal line

541 is a gate line of the display panel 501, and the second signal line 542 is a data line of the display panel 501.

Figure 2A:
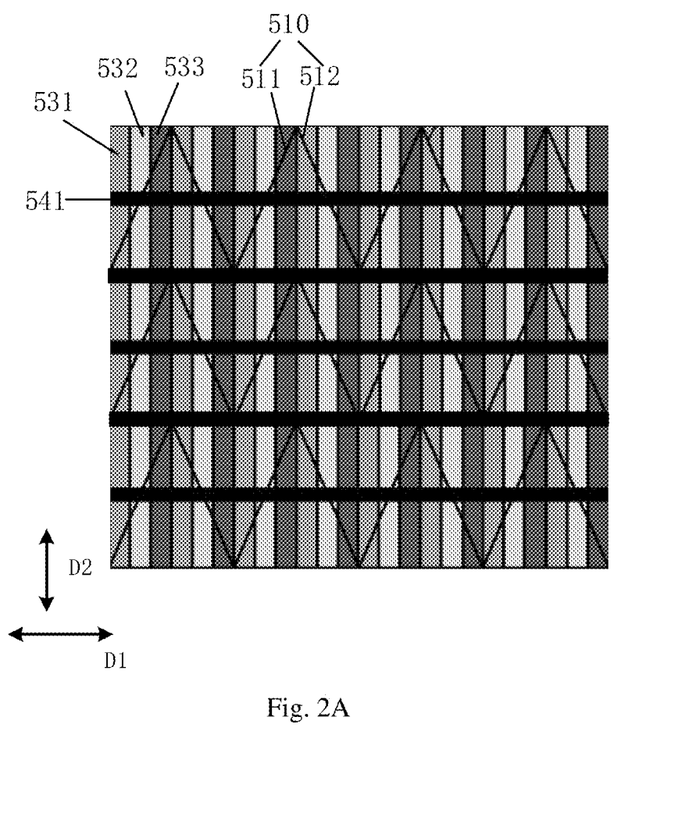
FIG. 2A illustrates a schematic diagram of a shielding effect of a gate line in the liquid crystal display device illustrated in FIG. 1A at a first viewing angle.

As illustrated in FIG. 1B, the light control panel 502 includes a plurality of gate lines 510 respectively extending along a first direction D1 and a plurality of data lines 521 respectively extending along a second direction D2 intersected with the first direction D1; the plurality of gate lines 510 are intersected with the plurality of data lines 521 to define a plurality of light control pixel units 523. For example, as illustrated in FIG. 2A, a width of the first signal line 541 is larger than a width of the gate line 510. For example, the first display sub-pixel unit 531, the second display sub-pixel unit 532 and the third display sub-pixel unit 533 have the same size as each other in the first direction D1; for example, the first display sub-pixel unit 531, the second display sub-pixel unit 532 and the third display sub-pixel unit 533 have the same size as each other in the second direction D2.

As illustrated in FIG. 1B, each gate line 510 is implemented as a polygonal-line shaped trace; each gate line 510 includes a plurality of first line segments 511 and a plurality of second line segments 512 which are alternately arranged (for example, alternately arranged in the first direction D1), and adjacent first line segment 511 and second line segment 512 are connected (for example, directly connected) to each other. As illustrated in FIG. 1B, an included angle (an acute angle) between the first line segment 511 (or/and the second line segment 512) and the first direction D1 is about 50 degrees-70 degrees to reduce the Moire problem of the liquid crystal display device 500. For example, the first line segment 511 and the second line segment 512 both are straight line segments.

FIG. 1C illustrates the light control pixel unit 523 of the light control panel 502 illustrated in FIG. 1A. As illustrated in FIG. 1C, a size of the light control pixel unit 523 in the first direction D1 is L1, and a size of the light control pixel unit 523 in the second direction D2 is L2. As illustrated in FIGS. 1B and 1C, the size L1 of the light control pixel unit 523 in the first direction D1 is equal to twice a size of the display pixel unit 530 in the first direction D1, and the size L2 of the light control pixel unit 523 in the second direction D2 is equal to four times a size of the display pixel unit 530 in the second direction D2.

During the research, the inventor of the present disclosure noticed that, by implementing the gate line 510 as a polygonal-line shaped trace, it is possible to suppress the problem of brightness unevenness of the liquid crystal display device 500, for example, the problem of black-and-white stripes or horizontal stripes (for example, the problem of black-and-white stripes at a side viewing angle). Specific analysis is as follows. In the case where the gate line 510 is implemented as a straight line, if an alignment error occurs when the light control panel 502 and the display panel 501 are bonded, an orthographic projection of the gate line 510 (straight line) on the display panel 501 will be overlapped with one row of display pixels of the display panel 501, so that the gate line 510 will block the light provided by the backlight unit 503, the brightness of the area of the liquid crystal display device 500 corresponding to the gate line 510 is close to zero (i.e., corresponding to black stripes), and the area of the liquid crystal display device 500 other than that corresponding to the gate line 510 corresponds to white stripes; in this case, the liquid crystal display device 500 involves black stripes and white stripes which are alternately arranged in the second direction D2, that is, the liquid crystal display device 500 may have the problem of black-and-white stripes. When the gate line 510 is implemented as a polygonal-line shaped trace, the problem of black-and-white stripes or horizontal stripes of the liquid crystal display device 500 can be suppressed.

During the research, the inventor of the present disclosure also noticed that, the liquid crystal display device 500 illustrated in FIGS. 1A and 1B may have at least one problem of color unevenness (Newton ring) and signal delay.

Figure 2B:
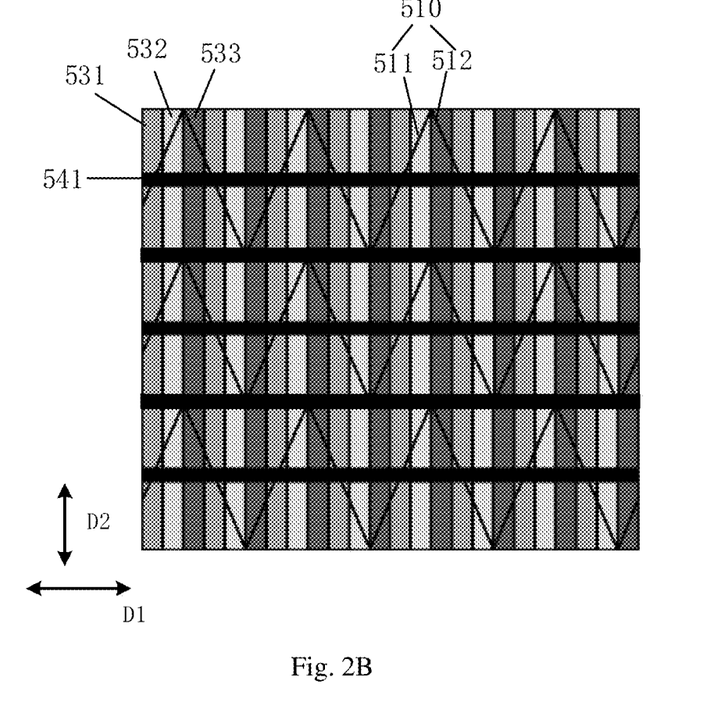
FIG. 2B illustrates a schematic diagram of a shielding effect of a gate line the liquid crystal display device illustrated in FIG. 1A at a second viewing angle.

For example, the liquid crystal display device 500 illustrated in FIGS. 1A and 1B may have the problem of Newton ring; Newton ring is such a problem that uneven color mixing is occurred in different areas of the display device. Specifically, when a predetermined display image of the display device is a white image, the image actually observed by the user involves colored stripes. The problem of Newton ring is related to the differences in shielding effects of the gate lines 510 to the display sub-pixel units of different colors at different viewing angles (for example, the viewing angles of users). Hereinafter, the problem of Newton ring will be exemplarily explained with reference to FIGS. 2A and 2B. FIG. 2A illustrates a schematic diagram of the shielding effect of the gate line 510 of the liquid crystal display device 500 illustrated in FIG. 1A at a first viewing angle (e.g., at a front viewing angle), and FIG. 2B illustrates a schematic diagram of the shielding effect of the gate line 510 of the liquid crystal display device 500 illustrated in FIG. 1A at a second viewing angle (e.g., at a side viewing angle) different from the first viewing angle. For convenience of explanation, it is assumed here that sizes of the first display sub-pixel unit 531, the second display sub-pixel unit 532 and the third display sub-pixel unit 533 in the first direction D1 are as same as each other; the first line segment 511 and the second line segment 512 are straight line segments. As illustrated in FIGS. 2A and 2B, since the sizes of the first display sub-pixel unit 531, the second display sub-pixel unit 532 and the third display sub-pixel unit 533 in the first direction D1 are as same as each other, a length of a portion of a line segment (e.g., the first line segment 511) corresponding to the first display sub-pixel unit 531 (e.g., the length in the extending direction of the first line segment 511), a length of a portion of a line segment (e.g., the first line segment 511) corresponding to the second display sub-pixel unit 532, and a length of a portion of a line segment (e.g., the first line segment 511) corresponding to the third display sub-pixel unit 533 are as same as each other. As illustrated in FIG. 2A, at the first viewing angle, since the portion of the line segment (e.g., the first line segment 511) corresponding to the second display sub-pixel unit 532 also overlaps with the first signal line 541, an overlapping area between the line segment (e.g., the first line segment 511) and the first display sub-pixel unit 531, and an overlapping area between the line segment (e.g., the first line segment 511) and the third display sub-pixel unit 533 both are smaller than an overlapping area between the line segment (e.g., the first line segment 511) and the second display sub-pixel unit 532. In this case, a display image at the first viewing angle is closer to the color of the second display sub-pixel unit 532. For similar reasons, as illustrated in FIG. 2B, the display image at the second viewing angle is closer to the color of the first display sub-pixel unit 532 (i.e., closer to the color of the display sub-pixel unit corresponding to the overlapping area between the line segment and the first signal line 541). Since the user observes the liquid crystal display device 500 within a certain viewing angle range, the image actually observed by the user involves colored stripes. It should be noted that, a portion of the line segment corresponding to the display sub-pixel unit refers to a portion of the line segment between two intersections of the line segment and the boundary of the display sub-pixel unit (for example, one column of display sub-pixel units where the display sub-pixel unit is located) in the first direction.

For another example, the liquid crystal display device 500 illustrated in FIGS. 1A and 1B may involve the problem of signal delay, because the included angle (acute angle) between the first line segment 511 (or/and the second line segment 512) and the first direction D1 is relatively large. As a result, the length of the first line segment 511 (or/and the second line segment 512) is relatively long, and hence a longer time is required for the signal to be transmitted from one end of the gate line 510 to the other end of the gate line 510.

Embodiments of the present disclosure provide an array substrate, a manufacturing method thereof, a light control panel and a display device. The array substrate includes a plurality of gate lines respectively extending along a first direction, a plurality of data lines respectively extending along a second direction intersected with the first direction, and a plurality of light control pixel units. Each gate line includes a plurality of grid parts arranged side by side along the first direction and connected in sequence, and each grid part includes a grid line and an opening area surrounded by the grid line. The array substrate can improve the display effect of the display device including the array substrate. For example, the array substrate can suppress the problem of nonuniformity (for example, at least one problem of brightness unevenness and color unevenness) of a display image of a display device including the array substrate.

The array substrate provided by the embodiments of the present disclosure will be explained in the following in a non-limiting manner by several examples and embodiments. As described below, different features in these specific examples and embodiments can be combined with each other without confliction, so as to obtain new examples and embodiments which are also fallen within the scope of protection of the present disclosure.

Figure 3:
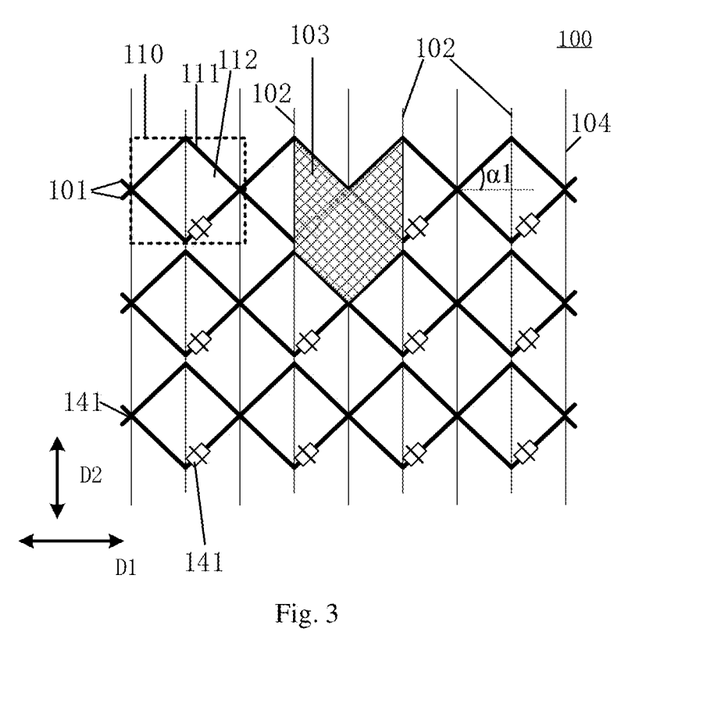
FIG. 3 is a schematic plan view of an array substrate provided by at least one embodiment of the present disclosure.

FIG. 3 is a schematic plan view of an array substrate 100 provided by at least one embodiment of the present disclosure. The array substrate 100 is applicable in a light control panel. As illustrated in FIG. 3, the array substrate 100 includes a plurality of gate lines 101 respectively extending along a first direction D1 and a plurality of data lines 102 respectively extending along a second direction D2 intersected with the first direction D1. For example, the first direction D1 is perpendicular to the second direction D2.

As illustrated in FIG. 3, the plurality of gate lines 101 and the plurality of data lines 102 are intersected to define a plurality of light control pixel units 103, each gate line 101 includes a plurality of grid parts 110 arranged side by side along the first direction D1 and connected in sequence, and each grid part 110 includes a grid line 111 and an opening area 112 surrounded by the grid line 111. For example, the plurality of gate lines 101 are configured to provide scanning signals (e.g., light control scanning signals), the plurality of data lines 102 are configured to provide data signals (e.g., light control data signals), and the above-mentioned light control data signals are configured to control the transmittance of the light control pixel units 103. For example, shapes and sizes of the plurality of grid parts 110 included in each gate line 101 are substantially the same.

For example, as illustrated in FIG. 3, the data line 102 may be a straight line parallel to the second direction D2, but the embodiments of the present disclosure are not limited to this, and according to practical application requirements, the data line 102 may also be implemented as a polygonal-line shaped trace, that is, the data line 102 has a bent structure.

For example, the display effect of the display device 01 including the array substrate 100 can be improved by allowing each gate line 101 to include a plurality of grid parts 110 arranged side by side along the first direction D1 and connected in sequence. For example, by allowing each gate line 101 to include a plurality of grid parts 110 arranged side by side along the first direction D1 and connected in sequence, a grid size of the light control panel 10 (see FIG. 7) including the array substrate 100 can be reduced (compared with the grid size of the light control panel 10 illustrated in FIG. 1B); in this case, a difference between grid sizes of the light control panel 10 including the array substrate 100 and the display panel of the display device 01 including the array substrate 100 can be reduced, thereby suppressing the Moire problem of the display device 01 including the array substrate 100 and improving the display effect of the display device 01 (see FIG. 8) including the array substrate 100. For example, the grid of the light control panel 10 including the array substrate 100 illustrated in FIG. 3 refers to a grid formed by adjacent grid part 110 and data line 102 and a grid corresponding to the grid part 110.

Figure 4:
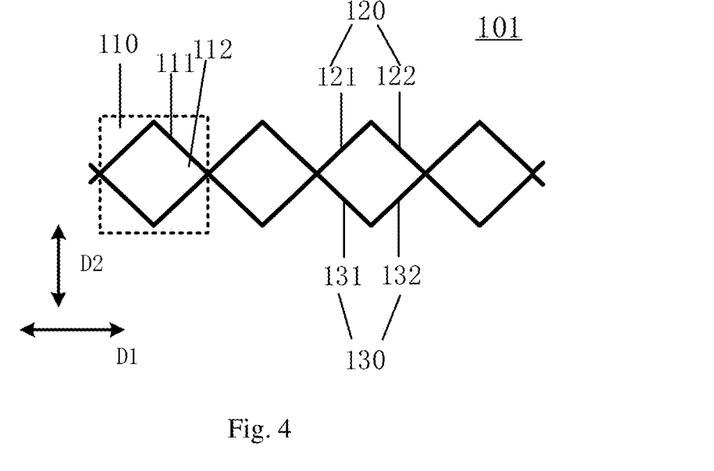
FIG. 4 illustrates a schematic plan view of a gate line of the array substrate illustrated in FIG. 3.

FIG. 4 illustrates a schematic plan view of the gate lines 101 of the array substrate 100 illustrated in FIG. 3. As illustrated in FIGS. 3 and 4, the grid line 111 of each grid part 110 includes a first polygonal-line shaped trace 120 and a second polygonal-line shaped trace 130. For example, a starting point of the first polygonal-line shaped trace 120 is connected with a starting point of the second polygonal-line shaped trace 130; an ending point of the first polygonal-line shaped trace 120 is connected with an ending point of the second polygonal-line shaped trace 130; a vertex of the first polygonal-line shaped trace 120 and a vertex of the second polygonal-line shaped trace 130 are spaced apart in the second direction D2. For example, the first polygonal-line shaped trace 120 and the second polygonal-line shaped trace 130 are arranged side by side in the second direction D2; a terminal point of the first polygonal-line shaped trace 120 and a corresponding terminal point of the second polygonal-line shaped trace 130 are directly connected; and the first polygonal-line shaped trace 120 and the second polygonal-line shaped trace 130 do not overlap in a direction perpendicular to the array substrate 100 except the terminal points of the first polygonal-line shaped trace 120 and the second polygonal-line shaped trace 130.

For example, the starting point and the ending point of the polygonal-line shaped trace refer to two points on the polygonal-line shaped trace which are farthest from each other in the first direction D1. For example, among the two points on the polygonal-line shaped trace that are farthest from each other in the first direction D1, the point at a first side (e.g., the left side) and the point at a second side (e.g., the right side) are the starting point and the ending point of the polygonal-line shaped trace, respectively.

As illustrated in FIGS. 3 and 4, the first polygonal-line shaped trace 120 includes a first line segment 121 and a second line segment 122 connected in sequence, and a connection point between the first line segment 121 and the second line segment 122 (the first line segment 121 and the second line segment 122 in the same grid part 110) is the vertex of the first polygonal-line shaped trace 120; the second polygonal-line shaped trace 130 includes a third line segment 131 and a fourth line segment 134 connected in sequence, and a connection point between the third line segment 131 and the fourth line segment 134 (the third line segment 131 and the fourth line segment 134 in the same grid part 110) is the vertex of the second polygonal-line shaped trace 130.

For example, the vertex of the polygonal-line shaped trace refers to a point on the polygonal-line shaped trace that is farthest from a virtual connecting line between the starting point and the ending point of the polygonal-line shaped trace in the second direction D2.

It should be noted that, the extension of the plurality of gate lines 101 along the first direction D1 only defines the extension direction of the gate lines 101 but is not intended to mean that the traces (the first polygonal-line shaped trace 120 and the second polygonal-line shaped trace 130) included in the gate lines 101 are parallel to the first direction D1.

For example, as illustrated in FIGS. 3 and 4, an absolute value of an acute angle between the first line segment 121 and the first direction D1, an absolute value of an acute angle between the second line segment 122 and the first direction D1, an absolute value of an acute angle between the third line segment 131 and the first direction D1, and an absolute value of an acute angle between the fourth line segment 134 and the first direction D1 are between 38 degrees and 55 degrees (for example, between 38 degrees and 50 degrees).

For example, the absolute value of the acute angle between the first line segment 121 and the first direction D1, the absolute value of the acute angle between the second line segment 122 and the first direction D1, the absolute value of the acute angle between the third line segment 131 and the first direction D1, and the absolute value of the acute angle between the fourth line segment 134 and the first direction D1 are as same as each other.

For example, by reducing the absolute value of the acute angle between first line segment 121 and first direction D1, the absolute value of the acute angle between the second line segment 122 and the first direction D1, the absolute value of the acute angle between the third line segment 131 and the first direction D1, and the absolute value of the acute angle between the fourth line segment 134 and the first direction D1, it is possible to reduce the difference in shading effects of the gate line 101 of the array substrate 100 to sub-pixels of different colors in the display panel 20 of the display device 01 including the array substrate 100, thereby suppressing the problem of Newton ring (for example, suppressing the problem of Newton ring in an image of pure color; an image of pure color refers to that the sub-pixels in the display device including the array substrate have the same colors).

For example, by reducing the absolute value of the acute angle between first line segment 121 and first direction D1, the absolute value of the acute angle between the second line segment 122 and the first direction D1, the absolute value of the acute angle between the third line segment 131 and the first direction D1, and the absolute value of the acute angle between the fourth line segment 134 and the first direction D1, it is also possible to reduce the length of the first line segment 121, the length of the second line segment 122, the length of the third line segment 131 and the length of the fourth line segment 134. Therefore, it is possible to shorten the time required for a signal to be transmitted from one end (e.g., the left end) of the gate line 101 to the other end (e.g., the right end) of the gate line 101, thereby mitigating the signal delay.

For example, as illustrated in FIGS. 3 and 4, the absolute value of the acute angle between the first line segment 121 and the first direction D1, the absolute value of the acute angle between the second line segment 122 and the first direction D1, the absolute value of the acute angle between the third line segment 131 and the first direction D1, and the absolute value of the acute angle between the fourth line segment 134 and the first direction D1 are between 42 degrees and 48 degrees (for example, between 43 degrees and 44 degrees).

For example, by allowing the absolute value $\alpha 1$ of the acute angle between the first line segment 121 and the first direction D1, the absolute value of the acute angle between the second line segment 122 and the first direction D1, the absolute value of the acute angle between the third line segment 131 and the first direction D1, and the absolute value of the acute angle between the fourth line segment 134 and the first direction D1 to be between 42 degrees and 48 degrees (e.g., between 43 degrees and 44 degrees), it is possible to suppress the problem of Newton ring and to mitigate signal delay without aggravating (e.g., without significantly aggravating) the problem of black-and-white stripes.

For example, by allowing each gate line 101 to include a plurality of grid parts 110 arranged side by side along the first direction D1 and connected in sequence, it is possible to reduce the absolute value of the acute angle between the first line segment 121 and the first direction D1, the absolute value of the acute angle between the second line segment 122 and the first direction D1, the absolute value of the acute angle between the third line segment 131 and the first direction D1, and the absolute value of the acute angle between the fourth line segment 134 and the first direction D1, so that (for example, it is ensured that) each row of display pixel units 204 in the display panel 20 of the display device 01 including the array substrate 100 is partially shielded by the gate lines 101, thereby avoiding the aggravation of black-and-white stripes.

For example, by allowing each gate line 101 to include a plurality of grid parts 110 arranged side by side along the first direction D1 and connected in sequence, it is also possible to avoid doubling the number of the light control pixel units 103 of the light control panel 10 under the condition that the absolute values of the acute angles between the first direction D1 and each of the first, second, third and fourth line segments 121, 122, 131 and 134 are reduced, because the decrease in the absolute values of the acute angles between the first direction D1 and each of the first, second, third and fourth line segments 121, 122, 131 and 134 will lead to an increase in the number of the gate lines of the array substrate under the condition that the gate line doesn't include a grid part. In this way, it can avoid an increase in a load (e.g., capacitive load) of the light control panel 10.

For example, as illustrated in FIGS. 3 and 4, the first polygonal-line shaped trace 120 and the second polygonal-line shaped trace 130 are symmetrical with respect to a connecting line (e.g., a virtual connecting line) between the starting point and the ending point of the first polygonal-line shaped trace 120; in this case, the display effect of the display device 01 including the array substrate 100 can be improved.

For example, as illustrated in FIGS. 3 and 4, the first line segment 121 and the second line segment 122 are symmetrical with respect to a connecting line (e.g., virtual connecting line) between the vertex of the first polygonal-line shaped trace 120 and the vertex of the second polygonal-line shaped trace 130; the third line segment 131 and the fourth line segment 134 are symmetrical with respect to the connecting line (e.g., a virtual connecting line) between the vertex of the first polygonal-line shaped trace 120 and the vertex of the second polygonal-line shaped trace 130; in this case, the display effect of the display device 01 including the array substrate 100 can be further improved.

For example, as illustrated in FIGS. 3 and 4, a boundary trace of the light control pixel unit 103 is formed by corresponding data lines 102 and the first polygonal-line shaped traces 120 of the grid parts 110 of corresponding gate lines 101; the second polygonal-line shaped trace 130 of the grid part 110 of each gate line 101 passes through an interior of the corresponding light control pixel unit 103. As illustrated in FIG. 3, two adjacent data lines 102 are intersected with the first polygonal-line shaped traces 120 of two adjacent gate lines; a portion of the two adjacent data lines 102 located between the first polygonal-line shaped traces 120 of the two adjacent gate lines and a portion of the first polygonal-line shaped traces 120 of the two adjacent gate lines located between the two adjacent data lines 102 form the boundary trace of the light control pixel unit 103.

For example, the array substrate includes a base substrate (not illustrated in the figure), and an orthographic projection of the second polygonal-line shaped trace 130 of the grid part 110 of each gate line 101 on the base substrate is completely covered by an orthographic projection of the light control pixel unit 103 corresponding to the second polygonal-line shaped trace 130 on the base substrate. For example, orthographic projections of the starting point, the ending point and the vertex of the second polygonal-line shaped trace 130 of the grid part 110 of each gate line 101 on the substrate are covered (for example, completely covered) by the orthographic projection of the boundary trace of the light control pixel unit 103 corresponding to the second polygonal-line shaped trace 130 on the base substrate.

Figure 5:
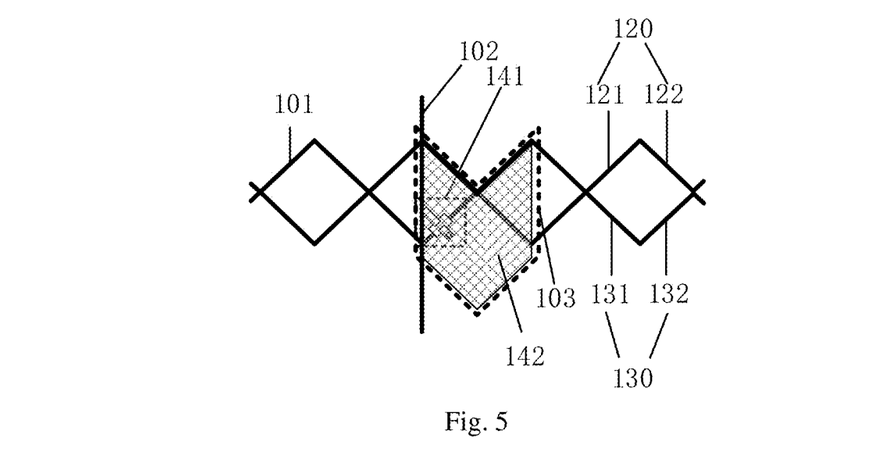
FIG. 5 illustrates a schematic plan view of a switching element and a pixel electrode of the array substrate illustrated in FIG. 3.

For example, each light control pixel unit 103 further includes a switching element 141 and a pixel electrode 142; FIG. 5 illustrates a schematic plan view of the switching element 141 and the pixel electrode 142 of the array substrate 100 illustrated in FIG. 3. As illustrated in FIG. 5, the switching element 141 includes a gate electrode, a source electrode and a drain electrode; the gate electrode of the switching element 141 is electrically connected with the corresponding second polygonal-line shaped trace 130 (i.e., the second polygonal-line shaped trace 130 passing through the light control pixel unit 103 including the switching element 141); one of the source electrode and the drain electrode of the switching element 141 is electrically connected with the pixel electrode 142 (e.g., electrically connected through a via hole), and the other one of the source electrode and the drain electrode of the switching element 141 is electrically connected with the data line 102. For example, the data line 102 that is electrically connected with the other one of the source electrode and the drain electrode of the switching element 141 refers to the data line closer to the switching element 141 among the two data lines which form the boundary trace of the light control pixel unit 103 including the switching element 141. For example, the number of the switching elements 141 is equal to the number of the second polygonal-line shaped traces 130 (that is, the number of the grid parts 110). For example, as illustrated in FIG. 5, the gate electrode of the switching element 141 is electrically connected to a position on the second polygonal-line shaped trace 130 close to the vertex of the second polygonal-line shaped trace 130. For example, the gate line 101 and the data line 102 can be formed of a metal material (such as copper, aluminum or aluminum alloy), and the pixel electrode 142 can be formed of a transparent conductive material. For example, the transparent conductive material is indium tin oxide (ITO) or indium zinc oxide (IZO).

For example, the pixel electrode 142 and the light control pixel unit 103 have substantially the same shape. For example, the pixel electrode 142 and the light control pixel unit 103 have substantially the same shape, which means that the designed shape of the pixel electrode 142 is as same as the designed shape of the light control pixel unit 103. In actual products, a certain deviation (for example, less than 5% or 10%) between shapes of the pixel electrode 142 and the light control pixel unit 103 is allowed.

For example, the pixel electrode 142 and the light control pixel unit 103 have substantially the same size. For example, the pixel electrode 142 and the light control pixel unit 103 have substantially the same size, which means that the ratio of the difference between sizes of the pixel electrode 142 and the light control pixel unit 103 to the average value of the sizes of the pixel electrode 142 and the light control pixel unit 103 is less than 10% (for example, less than 5%).

For example, as illustrated in FIGS. 3 and 4, each data line 102 has two overlapping positions with the grid line of a corresponding grid part 110 (that is, the grid part 110 overlapped with the orthographic projection of each data line 102 on the gate line) in the direction perpendicular to the array substrate 100. For example, the overlapping positions correspond to the vertex of the first polygonal-line shaped trace 120 and the vertex of the second polygonal-line shaped trace 130, respectively. For example, as illustrated in FIGS. 3 and 4, the array substrate 100 further includes common electrode lines 104 extending along the second direction D2, and the common electrode line 104 is overlapped with the connecting position between two adjacent grid parts 110 in the direction perpendicular to the array substrate 100. For example, as illustrated in FIGS. 3 and 4, the opening area 112 surrounded by each grid part 110 is partially overlapped with two light control pixel units 103 (for example, two light control pixel units 103 adjacent in the first direction D1) in the direction perpendicular to the array substrate 100. For example, as illustrated in FIG. 3, a plurality of common electrode lines 104 and a plurality of data lines 102 are alternately arranged in the first direction D1. It should be noted that, each data line 102 has two overlapping positions with the grid line of a corresponding grid part 110 in the direction perpendicular to the array substrate 100, which means that each data line 102 is overlapped with two positions on the grid line of one corresponding grid part 110 in the direction perpendicular to the array substrate 100, or the orthographic projection of each data line 102 on the gate line has two overlapping positions with the grid line of one corresponding grid part 110. For example, the common electrode line 104 is configured to receive a common electrode signal.

For example, a width of the first polygonal-line shaped trace 120 and a width of the second polygonal-line shaped trace 130 (e.g., the width in a direction perpendicular to the extending direction of the polygonal-line shaped trace) both are between 9 microns and 11 microns (e.g., 10 microns). For example, a width of the gate line 101 illustrated in FIG. 1B (for example, the width in a direction perpendicular to the extending direction of the gate line) is about 20 microns. For example, by allowing both of the width of the first polygonal-line shaped trace 120 and the width of the second polygonal-line shaped trace 130 illustrated in FIG. 3 to be about half of the width of the gate line 510 illustrated in FIG. 1B, it can prevent from a decrease of an aperture ratio of the display device 01 including the array substrate 100.

Figure 6A:
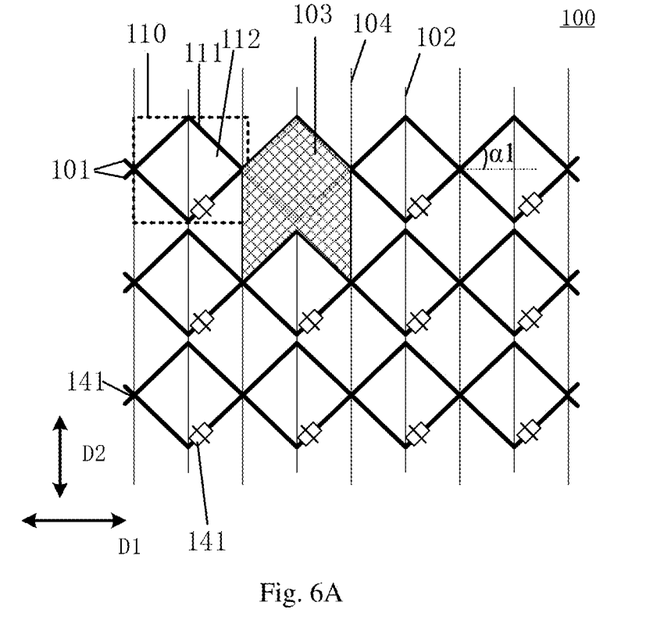
FIG. 6A illustrates a schematic plan view of another array substrate provided by at least one embodiment of the present disclosure.

FIG. 6A illustrates a schematic plan view of another array substrate 100 provided by at least one embodiment of the present disclosure, which is similar to the array substrate 100 illustrated in FIG. 3; only the differences between them will be described here, without repeating the similarities thereof.

The boundary trace of the light control pixel unit 103 of the array substrate 100 illustrated in FIG. 6A is formed by corresponding common electrode lines 104 and the first polygonal-line shaped traces 120 of the grid parts 110 of corresponding gate lines 101; the second polygonal-line shaped trace 130 of the grid part 110 of each gate line 101 passes through an interior of a corresponding light control pixel unit 103. In the array substrate 100 illustrated in FIG. 6A, the opening area 112 surrounded by each grid part 110 is at least partially overlapped (for example, completely overlapped) with one light control pixel unit 103 in the direction perpendicular to the array substrate 100.

As illustrated in FIG. 6A, two adjacent common electrode lines 104 are intersected with the first polygonal-line shaped traces 120 of adjacent two gate lines; and a portion of the two adjacent common electrode lines 104 located between the first polygonal-line shaped traces 120 of the two adjacent gate lines and a portion of the first polygonal-line shaped traces 120 of the two adjacent gate lines located between the adjacent two common electrode lines 104 form the boundary trace of the light control pixel unit 103.

Figure 6B:
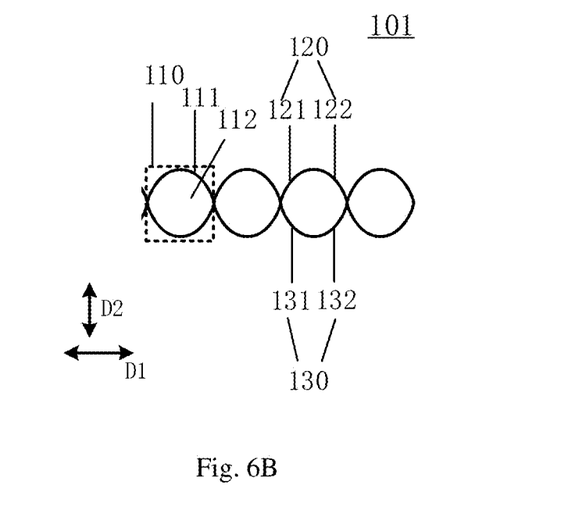
FIG. 6B illustrates a schematic plan view of another gate line of the array substrate provided by at least one embodiment of the present disclosure.

It should be noted that, the first line segment 121, the second line segment 122, the third line segment 131, and the fourth line segment 134 are not limited to the straight line segments illustrated in FIGS. 3 and 6A (correspondingly, the grid part 110 of the gate line 101 is not limited to a diamond shape), but may also be implemented as a curved line segment. FIG. 6B illustrates a schematic plan view of another gate line 101 of the array substrate 100 provided by at least one embodiment of the present disclosure. As illustrated in FIG. 6B, the first line segment 121, the second line segment 122, the third line segment 131 and the fourth line segment 134 are all realized as curved line segments.

In some examples, each data line 102 is overlapped with the connecting position of two adjacent grid parts 110 in the direction perpendicular to the array substrate 100; and the common electrode line 104 has two overlapping positions with the grid line of one corresponding grid part 110 (i.e., the grid part 110 that is overlapped with the orthographic projection of the common electrode line 104 on the gate line) in the direction perpendicular to the array substrate 100. It should be noted that, the common electrode line 104 has two overlapping positions with the grid line of one corresponding grid part 110 in the direction perpendicular to the array substrate 100, which means that the common electrode line 104 is overlapped with two positions on the grid line of one corresponding grid part 110 in the direction perpendicular to the array substrate 100, or the orthographic projection of the common electrode line 104 on the gate line has two overlapping positions with the grid line of one corresponding grid part 110.

Figure 7:
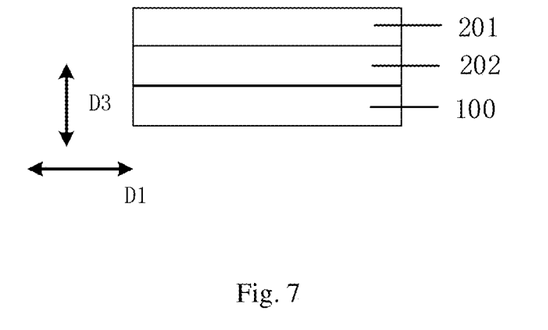
FIG. 7 is a schematic cross-sectional view of a light control panel provided by at least one embodiment of the present disclosure.

At least one embodiment of the present disclosure also provides a light control panel 10. FIG. 7 is a schematic cross-sectional view of a light control panel 10 provided by at least one embodiment of the present disclosure. As illustrated in FIG. 7, the light control panel 10 includes an opposite substrate 201, a liquid crystal layer 202 and any array substrate 100 provided by at least one embodiment of the present disclosure. The array substrate 100 and the opposite substrate 201 are arranged opposite to each other, and the liquid crystal layer 202 is sandwiched between the array substrate 100 and the opposite substrate 201. For example, as illustrated in FIG. 7, the opposite substrate 201, the liquid crystal layer 202 and the array substrate 100 are sequentially arranged in a third direction D3. For example, the third direction D3, the first direction D1 and the second direction D2 are intersected with each other (for example, are perpendicular to each other). For example, the array substrate 100 and the opposite substrate 201 are at least partially overlapped in the direction perpendicular to the light control panel 10 or in the third direction D3.

For example, the light control panel 10 can adjust the transmittance of each light control pixel unit 103 of the light control panel 10 (not illustrated in FIG. 7, see FIG. 8) based on the data signals as received, and the light control panel 10 can be utilized to provide the adjusted backlight to the display panel 20. For example, the light control pixel unit 103 of the light control panel is configured to control the intensity of light incident on the display sub-pixel unit (the display sub-pixel unit included in the display panel 20) corresponding to the light control pixel unit 103. For example, the plurality of light control pixel units 103 included in the light control panel 10 are substantially the same in shapes and sizes.

At least one embodiment of the present disclosure also provides a display device 01. The display device 01 can be implemented as a display device based on ADS (Advanced Super Dimension Switch) technology or a display device based on IPS-ADS (i.e., i-ADS, In-Plane Switch-Advanced Super Dimensional Switch) technology.

Figure 8:
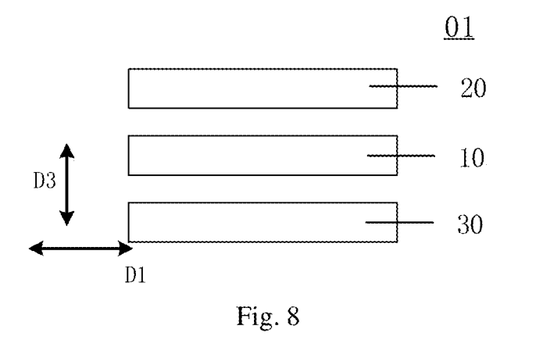
FIG. 8 is a schematic cross-sectional view of a display device provided by at least one embodiment of the present disclosure.

FIG. 8 is a schematic cross-sectional view of a display device 01 provided by at least one embodiment of the present disclosure. As illustrated in FIG. 8, the display device 01 includes a display panel 20, a backlight unit 30 and any light control panel 10 provided by at least one embodiment of the present disclosure. The display panel 20 is located at a light exiting side of the light control panel 10, and the backlight unit 30 is located at a side of the light control panel 10 away from the display panel 20. For example, as illustrated in FIG. 8, the display panel 20, the light control panel 10 and the backlight unit 30 are stacked in the third direction D3. For example, as illustrated in FIG. 8, the display panel 20, the light control panel 10, and the backlight unit 30 are sequentially arranged in the third direction D3. For example, the array substrate 100 of the light control panel 10 is closer to the backlight unit 30 than the opposite substrate 201 of the light control panel 10 to the backlight unit 30. For example, the resolution of the display panel 20 is twice that of the light control panel 10.

Figure 9A:
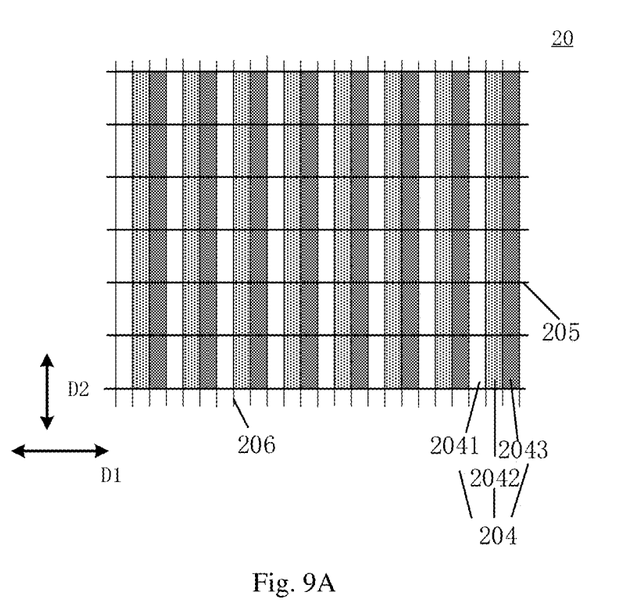
FIG. 9A is a schematic plan view of a display panel of the display device illustrated in FIG. 8.

FIG. 9A is a schematic plan view of the display panel 20 of the display device 01 illustrated in FIG. 8. As illustrated in FIG. 9A, the display panel 20 includes a plurality of first signal lines 205 extending along a first direction D1 and a plurality of second signal lines 206 extending along a second direction D2; the plurality of first signal lines 205 and the plurality of second signal lines 206 are intersected to define a plurality of display pixel units 204 (e.g., to define a plurality of display sub-pixel units). For example, the first signal line 205 is a gate line of the display panel 20, and the second signal line 206 is a data line of the display panel 20. For example, the first signal line 205 is configured to provide a scanning signal (e.g., a display scanning signal), the second signal line 206 is configured to provide a data signal (e.g., a display data signal), and the display data signal is configured to control the transmittance of the display sub-pixel unit. For example, the shapes and sizes of the plurality of display pixel units 204 are substantially the same.

As illustrated in FIG. 9A, each display pixel unit 204 includes a first display sub-pixel unit 2041, a second display sub-pixel unit 2042 and a third display sub-pixel unit 2043; the first display sub-pixel unit 2041, the second display sub-pixel unit 2042 and the third display sub-pixel unit 2043 are, for example, a red display sub-pixel unit, a green display sub-pixel unit and a blue display sub-pixel unit, respectively.

Figure 9B:
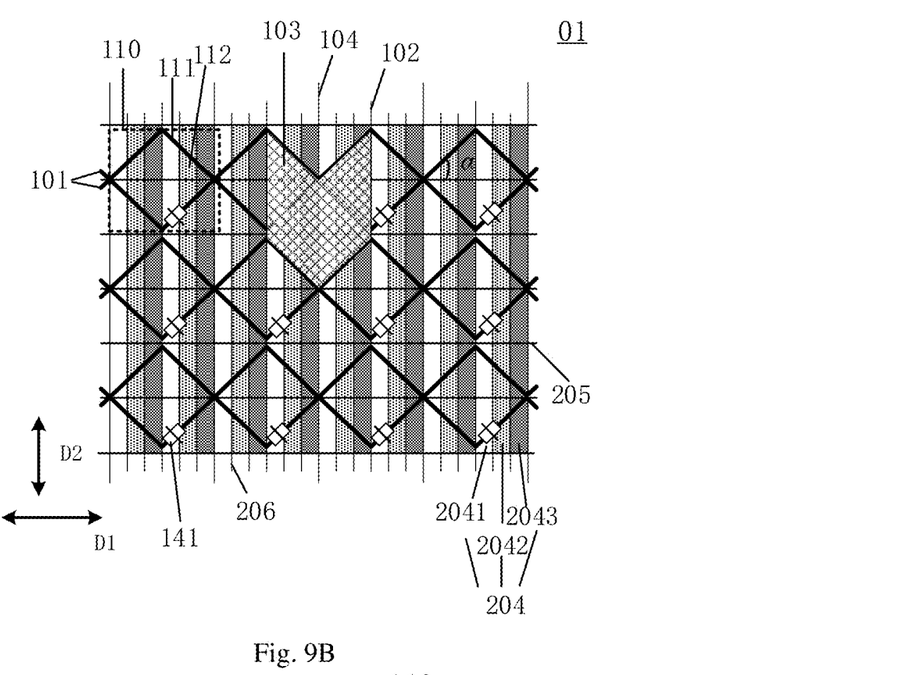
FIG. 9B is a schematic plan view of the display device illustrated in FIG. 8.

FIG. 9B is a schematic plan view of the display device 01 illustrated in FIG. 8. For example, as illustrated in FIG. 9B, the size of each display pixel unit 204 in the first direction D1 is equal to the size of each display pixel unit 204 in the second direction D2. As illustrated in FIG. 9B, the size of each display sub-pixel unit in the first direction D1 is equal to one third of the size of each display pixel unit 204 in the first direction D1. For example, a width of the first signal line 205 (the width of the first signal line 205 in the second direction or in a direction perpendicular to the extending direction of the first signal line 205) is larger than the width of the first polygonal-line shaped trace 120 (and the width of the second polygonal-line shaped trace 130). For example, the width of the first signal line 205 (the width of the first signal line 205 in the second direction) is equal to twice the width of the first polygonal-line shaped trace 120 (and the width of the second polygonal-line shaped trace 130). For example, the width of the polygonal-line shaped trace refers to a width of the polygonal-line shaped trace in a direction perpendicular to the extending direction of the polygonal-line shaped trace.

Figure 10:
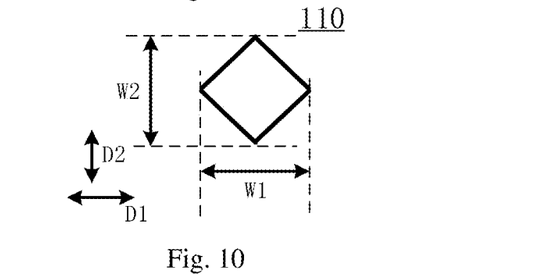
FIG. 10 is a schematic plan view of a grid part of the display device illustrated in FIG. 9B.

FIG. 10 is a schematic plan view of the grid part 110 of the display device 01 illustrated in FIG. 9B. As illustrated in FIGS. 9B and 10, a size of the grid part 110 in the first direction D1 is W1, and a size of the grid part 110 in the second direction D2 is W2. As illustrated in FIG. 9B, the size W1 of the grid part 110 in the first direction D1 is equal to twice the size of the display pixel unit 204 in the first direction D1; the size W2 of the grid part 110 in the second direction D2 is smaller than (slightly smaller than) twice the size of the display pixel unit 204 in the second direction D2 and is larger than the size of the display pixel unit 204 in the second direction D2. In some examples, the size W2 of the grid part 110 in the second direction D2 may also be equal to twice the size of the display pixel unit 204 in the second direction D2; in this case, the vertex of the first polygonal-line shaped trace 120 and the vertex of the second polygonal-line shaped trace 130 are intersected with the second direction D2.

For example, a size of the grid part 110 in the first direction D1 refers to a distance between two points (e.g., the vertex of the first polygonal-line shaped trace 120 and the vertex of the second polygonal-line shaped trace 130) of the grid part 110 that are farthest from each other in the first direction D1; a size of the grid part 110 in the second direction D2 refers to a distance between two points (e.g., the starting point and the ending point of the first polygonal-line shaped trace 120) of the grid part 110 that are farthest from each other in the second direction D2.

Figure 11:
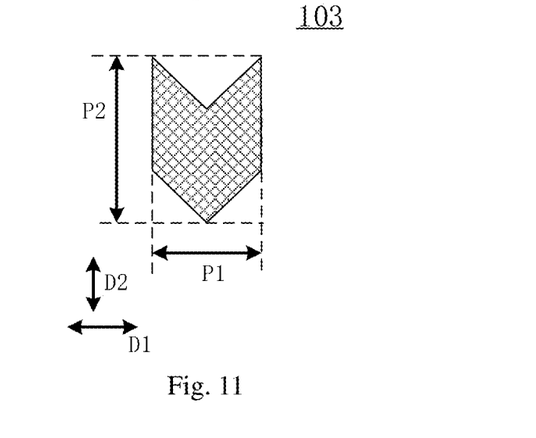
FIG. 11 is a schematic plan view of a pixel unit of the display device illustrated in FIG. 9B.

FIG. 11 is a schematic plan view of a pixel unit of the display device 01 illustrated in FIG. 9B. As illustrated in FIG. 9B and FIG. 11, the size of the light control pixel unit 103 in the first direction D1 is P1, and the size of the light control pixel unit 103 in the second direction D2 is P2. As illustrated in FIGS. 1B and 1C, the size P1 of the light control pixel unit 103 in the first direction D1 is equal to twice the size of the display pixel unit 204 in the first direction D1; the size of the light control pixel unit 103 in the second direction D2 is equal to 2.5 times to 3 times the size of the display pixel unit 204 in the first direction D1.

It should be noted that, the size of the pixel unit in the second direction D2 is equal to the distance, in the second direction D2, between two parallel lines which are parallel to the first direction D1 and are connected to the vertices on both sides of the pixel unit in the second direction D2; for example, the size of the pixel unit in the second direction D2 is equal to a spaced distance in the second direction D2 between, the parallel line that is connected with the vertex of the pixel unit on the upper side of the second direction D2 and is parallel to the first direction D1, and, the parallel line that is connected with the vertex of the pixel unit on the lower side of the second direction D2 and is parallel to the first direction D1.

For example, the display device 01 further includes an isotropic diffusion film (not illustrated in the figure) disposed between the display panel 20 and the light control panel 10. The isotropic diffusion film can diffuse the light emitted from the light control panel 10 within a small angle range, so as to blur the pattern of the data line 102 and to further eliminate the Moire effect; and at the same time, it will not have any significant influence on the direction of the light emitted from the light control panel 10.

For example, the display device 01 can be any product or component with display function, such as a mobile phone, a tablet computer, a television, a monitor, a notebook computer, a digital photo frame, a navigator, etc. It should be noted that, other constituent parts of the display device (e.g., control device, image data encoding/decoding device, row scanning driver, column scanning driver, clock circuit and the like) can adopt any suitable components, which should be understood by those ordinary skilled in the art, and will not be described in details here, nor should it be taken as a limitation of this disclosure. The display device can improve the display effect.

For example, based on the same inventive concept, at least one embodiment of the present disclosure also provides a manufacturing method of an array substrate. The manufacturing method of the array substrate includes: forming a plurality of gate lines respectively extending along a first direction, a plurality of data lines respectively extending along a second direction intersected with the first direction, and a plurality of light control pixel units.

For example, each gate line includes a plurality of grid parts arranged side by side along the first direction and connected in sequence, and each grid part includes a grid line and an opening area surrounded by the grid line. For example, the specific structure of the array substrate can be referred to the array substrate provided in at least one embodiment of the present disclosure, and will not be described in detail here. For example, the display device including the array substrate manufactured by the manufacturing method can have improved display effect.

Although the present disclosure has been described in details above with general description and specific embodiments, it is obvious to those skilled in the art that some modifications or improvements can be made based on the embodiments of the present disclosure. Therefore, these modifications or improvements made without departing from the spirit of the present disclosure are all fallen within the scope of protection of the present disclosure.

The above are merely exemplary embodiments of the present disclosure, and are not intended to limit the scope of protection of the present disclosure, which is determined by the appended claims.

What is claimed is:

1. An array substrate, comprising a plurality of gate lines respectively extending along a first direction, a plurality of data lines respectively extending along a second direction intersected with the first direction, and a plurality of light control pixel units, wherein each of the plurality of gate lines comprises a plurality of grid parts arranged side by side along the first direction and connected in sequence, and each of the plurality of grid parts comprises a grid line and an opening area surrounded by the grid line, wherein the opening area surrounded by each of the plurality of grid parts is partly overlapped with one or two of the plurality of light control pixel units in a direction perpendicular to the array substrate.

2. The array substrate according to claim 1, wherein the grid line of each of the plurality of grid parts comprises a first polygonal-line shaped trace and a second polygonal-line shaped trace;
   a starting point of the first polygonal-line shaped trace is connected with a starting point of the second polygonal-line shaped trace;
   an ending point of the first polygonal-line shaped trace is connected with an ending point of the second polygonal-line shaped trace; and
   a vertex of the first polygonal-line shaped trace and a vertex of the second polygonal-line shaped trace are spaced apart in the second direction.

3. The array substrate according to claim 2, wherein the first polygonal-line shaped trace comprises a first line segment and a second line segment which are sequentially connected, and a connection point between the first line segment and the second line segment is the vertex of the first polygonal-line shaped trace;
   the second polygonal-line shaped trace comprises a third line segment and a fourth line segment which are sequentially connected, and a connection point between the third line segment and the fourth line segment is the vertex of the second polygonal-line shaped trace; and
   an absolute value of an acute angle between the first line segment and the first direction, an absolute value of an acute angle between the second line segment and the first direction, an absolute value of an acute angle between the third line segment and the first direction, and an absolute value of an acute angle between the fourth line segment and the first direction are between 38 degrees and 55 degrees.

4. The array substrate according to claim 3, wherein the absolute value of the acute angle between the first line segment and the first direction, the absolute value of the acute angle between the second line segment and the first direction, the absolute value of the acute angle between the third line segment and the first direction, and the absolute value of the acute angle between the fourth line segment and the first direction are between 42 degrees and 48 degrees.

5. The array substrate according to claim 3, wherein the first polygonal-line shaped trace and the second polygonal-line shaped trace are symmetrical with respect to a connecting line between the starting point of the first polygonal-line shaped trace and the ending point of the first polygonal-line shaped trace.

6. The array substrate according to claim 3, wherein the first line segment and the second line segment are symmetrical with respect to a connecting line between the vertex of the first polygonal-line shaped trace and the vertex of the second polygonal-line shaped trace; and
   the third line segment and the fourth line segment are symmetrical with respect to the connecting line between the vertex of the first polygonal-line shaped trace and the vertex of the second polygonal-line shaped trace.

7. The array substrate according to claim 1, wherein each of the plurality of data lines has two overlapping positions with the grid line of one corresponding grid part in a direction perpendicular to the array substrate, or each of the plurality of data lines is overlapped with a connecting position between two adjacent grid parts in the direction perpendicular to the array substrate.

8. The array substrate according to claim 7, further comprising common electrode lines extending along the second direction,
   wherein each of the common electrode lines is overlapped with the connecting position between the two adjacent grid parts in the direction perpendicular to the array substrate, or
   each of the common electrode lines has two overlapping positions with the grid line of one corresponding grid part in the direction perpendicular to the array substrate.

9. The array substrate according to claim 2, wherein a boundary trace of each of the plurality of light control pixel units is formed by corresponding data lines and the first polygonal-line shaped traces of the grid parts of corresponding gate lines; and
   the second polygonal-line shaped trace of the grid part of each of the plurality of gate lines passes through an interior of a corresponding light control pixel unit.

10. The array substrate according to claim 2, further comprising common electrode lines extending along the second direction, wherein
   each of the common electrode lines is overlapped with a connecting position between two adjacent grid parts in a direction perpendicular to the array substrate;
   a boundary trace of each of the plurality of light control pixel units is formed by corresponding common electrode lines and the first polygonal-line shaped traces of the grid parts of corresponding gate lines; and
   the second polygonal-line shaped trace of the grid part of each of the plurality of gate lines passes through an interior of a corresponding light control pixel unit.

11. The array substrate according to claim 2, wherein each of the plurality of light control pixel units further comprises a switching element and a pixel electrode;
   the switching element comprises a gate electrode, a source electrode and a drain electrode,
   the gate electrode of the switching element is electrically connected with a corresponding second polygonal-line shaped trace, and one of the source electrode and the drain electrode of the switching element is electrically connected with the pixel electrode; and
   the switching element and the second polygonal-line shaped trace have the same amount as each other.

12. The array substrate according to claim 2, wherein a width of the first polygonal-line shaped trace and a width of the second polygonal-line shaped trace both are between 9 microns and 11 microns.

13. The array substrate according to claim 1, wherein the grid line of each of the plurality of grid parts comprises a first polygonal-line shaped trace and a second polygonal-line shaped trace;
   a starting point of the first polygonal-line shaped trace is connected with a starting point of the second polygonal-line shaped trace; an ending point of the first polygonal-line shaped trace is connected with an ending point of the second polygonal-line shaped trace;
   a vertex of the first polygonal-line shaped trace and a vertex of the second polygonal-line shaped trace are spaced apart in the second direction;
   the first polygonal-line shaped trace comprises a first line segment and a second line segment which are sequentially connected, and a connection point between the first line segment and the second line segment is the vertex of the first polygonal-line shaped trace;

the second polygonal-line shaped trace comprises a third line segment and a fourth line segment which are sequentially connected, and a connection point between the third line segment and the fourth line segment is the vertex of the second polygonal-line shaped trace;

an absolute value of an acute angle between the first line segment and the first direction, an absolute value of an acute angle between the second line segment and the first direction, an absolute value of an acute angle between the third line segment and the first direction, and an absolute value of an acute angle between the fourth line segment and the first direction are between 42 degrees and 48 degrees;

the first polygonal-line shaped trace and the second polygonal-line shaped trace are symmetrical with respect to a connecting line between the starting point of the first polygonal-line shaped trace and the ending point of the first polygonal-line shaped trace;

the first line segment and the second line segment are symmetrical with respect to a connecting line between the vertex of the first polygonal-line shaped trace and the vertex of the second polygonal-line shaped trace;

the third line segment and the fourth line segment are symmetrical with respect to the connecting line between the vertex of the first polygonal-line shaped trace and the vertex of the second polygonal-line shaped trace;

each of the plurality of data lines has two overlapping positions with the grid line of one corresponding grid part in a direction perpendicular to the array substrate;

the array substrate further comprises common electrode lines extending along the second direction, each of the common electrode lines is overlapped with a connecting position between two adjacent grid parts in the direction perpendicular to the array substrate;

the opening area surrounded by each of the plurality of grid parts is partly overlapped with two of the plurality of light control pixel units in the direction perpendicular to the array substrate;

a boundary trace of the light control pixel unit is formed by corresponding data lines and the first polygonal-line shaped traces of the grid parts of corresponding gate lines, the second polygonal-line shaped trace of the grid part of each of the plurality of gate lines passes through an interior of a corresponding light control pixel unit; and each of the plurality of light control pixel units further comprises a switching element and a pixel electrode, the switching element comprises a gate electrode, a source electrode and a drain electrode; the gate electrode of the switching element is electrically connected with a corresponding second polygonal-line shaped trace; one of the source electrode and the drain electrode of the switching element is electrically connected with the pixel electrode; and the switching element and the second polygonal-line shaped trace have the same amount as each other.

14. A light control panel, comprising an array substrate, an opposite substrate and a liquid crystal layer, wherein
the array substrate and the opposite substrate are arranged opposite to each other;
the liquid crystal layer is sandwiched between the array substrate and the opposite substrate;
the array substrate comprises a plurality of gate lines respectively extending along a first direction, a plurality of data lines respectively extending along a second direction intersected with the first direction, and a plurality of light control pixel units;
each of the plurality of gate lines comprises a plurality of grid parts arranged side by side along the first direction and connected in sequence; and
each of the plurality of grid parts comprises a grid line and an opening area surrounded by the grid line, wherein the opening area surrounded by each of the plurality of grid parts is partly overlapped with one or two of the plurality of light control pixel units in a direction perpendicular to the array substrate.

15. A display device, comprising: a display panel, a light control panel, and a backlight unit, wherein
the display panel is located at a light exiting side of the light control panel;
the backlight unit is located at a side of the light control panel away from the display panel;
the light control panel comprises an array substrate, an opposite substrate and a liquid crystal layer;
the array substrate and the opposite substrate are disposed opposite to each other;
the liquid crystal layer is sandwiched between the array substrate and the opposite substrate;
the array substrate comprises a plurality of gate lines respectively extending along a first direction, a plurality of data lines respectively extending along a second direction intersected with the first direction, and a plurality of light control pixel units;
each of the plurality of gate lines comprises a plurality of grid parts arranged side by side along the first direction and connected in sequence; and
each of the plurality of grid parts comprises a grid line and an opening area surrounded by the grid line, wherein the opening area surrounded by each of the plurality of grid parts is partly overlapped with one or two of the plurality of light control pixel units in a direction perpendicular to the array substrate.

16. The display device according to claim 15, wherein the display panel comprises a plurality of display pixel units arranged in an array;
a size of each of the plurality of grid parts in the first direction is equal to twice a size of each of the plurality of display pixel units in the first direction; and
a size of each of the plurality of grid parts in the second direction is less than or equal to twice a size of each of the plurality of display pixel units in the second direction.

17. The display device according to claim 15, wherein a size of each of the plurality of light control pixel units in the first direction is equal to twice a size of each of the plurality of display pixel units in the first direction; and
a size of each of the plurality of light control pixel units in the second direction is equal to 2.5 times to 3 times the size of each of the plurality of display pixel units in the first direction.

* * * * *